United States Patent
Chokai et al.

(10) Patent No.: US 7,838,622 B2
(45) Date of Patent: Nov. 23, 2010

(54) DOPE AND PROCESS FOR THE PRODUCTION OF FIBER FROM THE DOPE

(75) Inventors: Masayuki Chokai, Iwakuni (JP); Anton Peter De Weijer, Iwakuni (JP); Hiroaki Kuwahara, Iwakuni (JP); Dennis Wilbers, Iwakuni (JP)

(73) Assignees: Teijin Limited, Osaka (JP); Teijin Techno Products Limited, Osaka (JP)

( * ) Notice: Subject to any disclaimer, the term of this patent is extended or adjusted under 35 U.S.C. 154(b) by 0 days.

(21) Appl. No.: 12/092,390

(22) PCT Filed: Nov. 1, 2006

(86) PCT No.: PCT/JP2006/322317

§ 371 (c)(1),
(2), (4) Date: Nov. 7, 2008

(87) PCT Pub. No.: WO2007/052825

PCT Pub. Date: May 10, 2007

(65) Prior Publication Data

US 2009/0127735 A1    May 21, 2009

(30) Foreign Application Priority Data

Nov. 2, 2005 (JP) ............................. 2005-319412

(51) Int. Cl.
*C08G 69/00* (2006.01)
*C08G 69/28* (2006.01)

(52) U.S. Cl. ........................... 528/327; 51/298; 264/10; 521/154; 528/26; 528/336

(58) Field of Classification Search .................. 51/298; 264/10; 521/154; 528/26
See application file for complete search history.

(56) References Cited

U.S. PATENT DOCUMENTS

| | | | |
|---|---|---|---|
| 5,260,365 A | 11/1993 | Wolfe et al. | |
| 5,534,614 A * | 7/1996 | O'Briem et al. | ............. 528/183 |
| 2001/0003130 A1 | 6/2001 | Matsuoka et al. | |

FOREIGN PATENT DOCUMENTS

| | | |
|---|---|---|
| GB | 1 142 071 | 2/1969 |
| JP | 60-500538 | 4/1985 |
| JP | 60-500538 A | 4/1985 |
| JP | 11-322929 A | 11/1999 |
| JP | 2001-226485 A | 7/2001 |
| WO | 84/01162 | 3/1984 |
| WO | 85/04178 | 9/1985 |

* cited by examiner

*Primary Examiner*—Terressa M Boykin
(74) *Attorney, Agent, or Firm*—Sughrue Mion, PLLC

(57) ABSTRACT

This invention is to provide a dope that has excellent formability and can be formed into a fiber, a film, pulp-shaped particles and the like by a wet method. This invention is also to provide a process for the production of a fiber excellent in heat resistance, strength and elastic modulus. This invention provides a dope and a process for the production of a fiber from the dope, the dope including a polyamide and a basic solvent, the polyamide containing a recurring unit of the following formula (I),

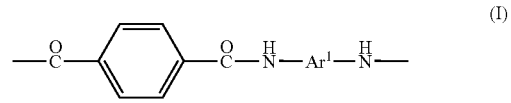

(I)

wherein $Ar^1$ represents at least one substituent selected from the group consisting of

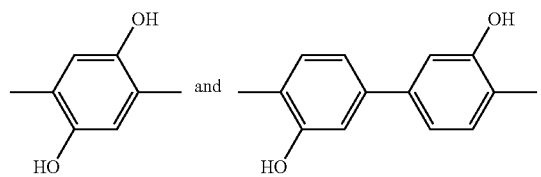

and having an inherent viscosity of 1.0 or more, the dope has a polyamide concentration of over 10% by weight but not more than 25% by weight and exhibits optical anisotropy at 50° C.

17 Claims, No Drawings

DOPE AND PROCESS FOR THE PRODUCTION OF FIBER FROM THE DOPE

TECHNICAL FIELD

This invention relates to a dope useful for the production of a formed article of polyoxazole excellent in heat resistance and dynamical properties and a process for the production of a fiber from the dope.

BACKGROUND ART

It is known that poly-p-phenyleneterephthalamide (to be sometimes referred to as "PPTA" hereinafter) typified by Twaron and Kevlar and poly-p-phenylenebenzobisoxazole (to be sometimes referred to as "PBO" hereinafter) typified by Zylon are useful as raw materials for fibers and other formed products excellent in heat resistance and mechanical properties.

Patent Document 1 describes benzobisoxazole and a process for the production of a pyridine-benzobisoxazole copolymer.

Patent Document 2 describes a production of a film or fiber, in which an aqueous solution of an alkali metal salt of an aromatic polyamide having a biphenylhydroxy group as a substituent is extruded into a coagulating liquid, followed by forming and stretching or drawing.

(Patent Document 1) WO85/04178
(Patent Document 2) GB1142071

DISCLOSURE OF THE INVENTION

It is an object of this invention to provide a dope that has excellent formability and that can be formed into a fiber, a film, pulp-like particles, etc., by a wet method.

It is another object of this invention to provide a dope that undergoes molecular orientation by only forming to give a formed article excellent in elastic modulus and heat resistance. It is further another object of this invention to provide a dope that contains a solvent having little corrosive action on a metal so that the corrosion of an apparatus can be suppressed.

It is still another object of this invention to provide a process for the production of a fiber excellent in heat resistance, strength and elastic modulus.

The present inventors have found that when a basis solvent is caused to contain a high concentration of a high-molecular-weight aromatic polyamide having a hydroxyl group, an optically anisotropic dope can be obtained. It has been found that when the above optically anisotropic dope is spun by a wet method, the thus-obtained spun fiber is oriented to a high degree by heat treatment thereof and gives a fiber of a polyoxazole excellent in strength and mechanical properties such as elastic modulus, etc., and this invention has been accordingly completed.

Further, it has been found that when the spun fiber is drawn and then coagulated in a coagulating liquid after the spinning of the dope, there can be obtained a fiber having excellent mechanical properties as compared with a case where the spun fiber is coagulated and then drawn, and this invention has been accordingly completed.

That is, this invention provides a dope comprising a polyamide and a basic solvent, the polyamide containing a recurring unit of the following formula (I),

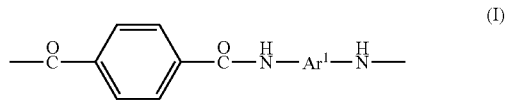

wherein $Ar^1$ represents at least one substituent selected from the group consisting of

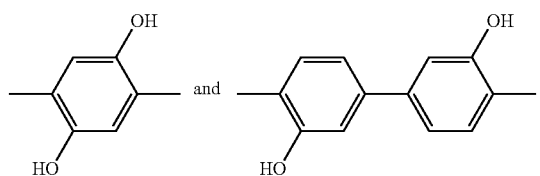

and having an inherent viscosity of 1 or more, the dope has a polyamide concentration of over 10% by weight but not more than 30% by weight and exhibits optical anisotropy at 50° C.

Further, this invention provides a process for the production of a fiber formed of a polyoxazole containing at least one recurring unit selected from the group consisting of the recurring units of the following formulae (I-a) and (I-b),

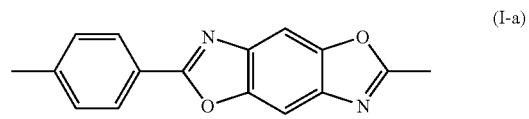

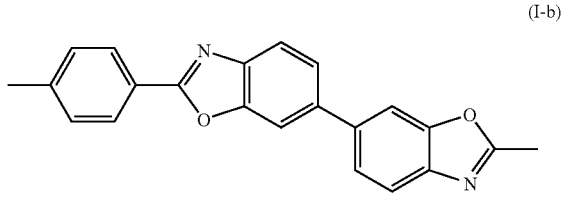

which comprises spinning a fiber out of a dope comprising a polyamide of the following formula (I) and a basic solvent, the polyamide containing a recurring unit of the following formula (I),

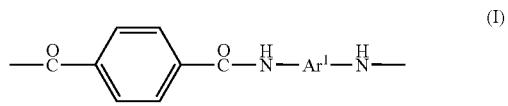

wherein $Ar^1$ represents at least one substituent selected from the group consisting of

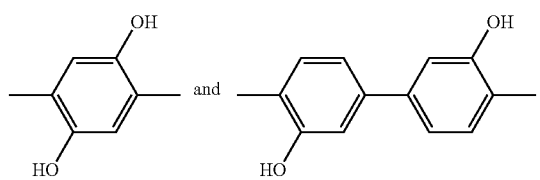

and having an inherent viscosity of 1 or more, the dope has a polyamide concentration of over 10% by weight but not more than 30% by weight and exhibits optical anisotropy at 50° C., drawing a spun fiber, coagulating the fiber in a coagulating liquid and heat-treating the thus-obtained fiber at 200 to 900° C.

PREFERRED EMBODIMENTS OF THE INVENTION

Dope

The dope of this invention contains a polyamide and a basic solvent, has a polyamide concentration of over 10% by weight but not more than 30% by weight and exhibits optical anisotropy at 50° C.

(Polyamide)

The polyamide contains a recurring unit of the following formula (I),

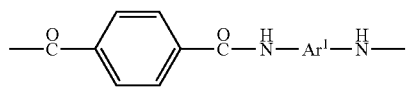

(I)

wherein $Ar^1$ is at least one substituent selected from the group consisting of

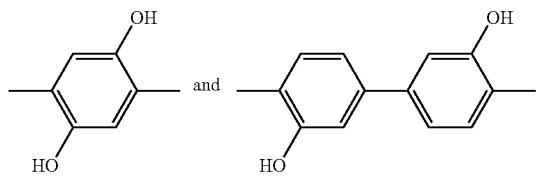

and has an inherent viscosity of 1 or more.

The polyamide preferably contains 50 to 100 mol % of the recurring unit of the formula (I) and 50 to 0 mol % of a recurring unit of the formula (II).

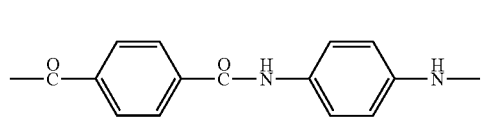

(II)

Further, preferably, the polyamide contains 80 to 100 mol % of the recurring unit of the formula (I) and 20 to 0 mol % of the recurring unit of the formula (II). Further, preferably, the polyamide contains 90 to 100 mol % of the recurring unit of the formula (I) and 10 to 0 mol % of the recurring unit of the formula (II). Further, preferably, the polyamide contains 95 to 100 mol % of the recurring unit of the formula (I) and 5 to 0 mol % of the recurring unit of the formula (II).

The inherent viscosity ($\eta_{inh}$) of the polyamide is preferably 1 or more, more preferably 1.5 to 50, still more preferably 3 to 10. The above inherent viscosity refers to a value obtained by measurement in a solution of 0.5 g of the above polyamide in 1 dl of 95 wt % concentrated sulfuric acid at 30° C.

(Solvent)

The solvent is a basic solvent. The basis solvent includes sodium hydroxide, potassium hydroxide, calcium hydroxide, lithium hydroxide and the like. Further, the basic solvent includes hydroxide aqueous solutions of alkali metals and alkaline earth metals. These may be used singly or in combination. The basis solvent is preferably sodium hydroxide or potassium hydroxide. The pH of the dope is preferably 7 or higher, more preferably 10 to 14.

The dope of this invention has a characteristic feature that it exhibits optical anisotropy at 50° C. This optical anisotropy refers to a state where, for example, the dope is sandwiched between two glass plates and observed under crossed Nicols through a microscope to show optical anisotropy. For allowing the dope to exhibit optical anisotropy, the polyamide is required to be dissolved in a high concentration. The polyamide concentration in the dope is over 10% by weight but not more than 30% by weight, preferably 12 to 30% by weight, more preferably 15 to 30% by weight, particularly preferably 15 to 25% by weight.

(Preparation of Dope)

The dope of this invention can be prepared by carrying out a solution polymerization of (a) an aromatic dicarboxylic acid compound and (b) an aromatic diamine, isolating the thus-formed polyamide from the solution and then dissolving the polyamide in a solvent.

The (a) aromatic dicarboxylic acid compound includes a compound of the following formula (A).

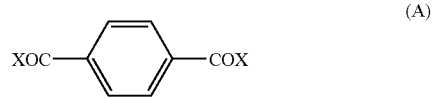

(A)

In the formula (A), X is OH, a halogen atom or a group represented by OR in which R is a monovalent aromatic group having 6 to 20 carbon atoms. The aromatic group includes aryl groups such as phenyl.

As an (a) aromatic dicarboxylic acid compound, terephthalic acid chloride or a compound of the formula (A) in which X=Cl is preferred. For improving the properties of a polyamide to be obtained, dicarboxylic acids other than the compound of the above formula (A) may be further copolymerized. Specifically, isophthalic acid chloride and 2,6-naphthalenedicarboxylic acid chloride may be used.

The (b) aromatic diamine for use in this invention includes an aromatic diamine (3,3'-dihydroxybenzidine) of the following formula (B),

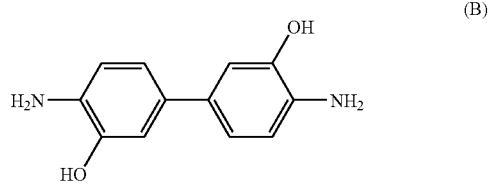

(B)

an aromatic diamine (1,4-diamino-2,5-dihydroxybenzene) of the following formula (C)

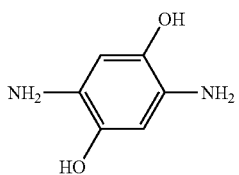
(C)

and hydrochlorides, sulfate and phosphates of these.

For improving the properties of a polyamide to be obtained, the following diamine may be copolymerized. Specific examples of the diamine include p-phenylenediamine, m-phenylenediamine, 1,4-diaminonaphthalene, 1,5-diaminonapthalene, 1,8-diaminonaphthalene, 2,6-diaminonaphthalene, 2,7-diaminonaphthalene, 2,5-diaminopyridine, 2,6-diaminopyridine, 3,5-diaminopyridine, 3,3'-diaminobiphenyl, 3,3'-dichlorobenzidine, 3,3'-diaminodiphenyl ether, 3,4'-diaminodiphenyl ether and 4,4'-diaminodiphenyl ether. Of these, p-phenylenediamine is preferred.

The solvent that is used for carrying out the polymerization is not specially limited, and any solvent can be used so long as it dissolves the above monomers (A), (B) and (C) as raw materials, is substantially non-reactive with them and can serve to give a polyamide having an inherent viscosity of 1.0 or more, preferably 1.2 or more. Examples of the solvent include amide-containing solvents such as N,N,N',N'-tetramethylurea (TMU), N,N-dimethylacetamide (DMAC), N,N-diethylacetamide (DEAC), N,N-dimethylpropionamide (DMPR), N,N-dimethylbutylamide (NMBA), N,N-dimethylisobutylamide (NMIB), N-methyl-2-pyrrolidinone (NMP), N-cyclohexyl-2-pyrrolidinone (NCP), N-ethylpyrrolidone-2 (NEP), N-methylcaprolactam (NMC), N,N-dimethylmethoxyacetamide, N-acetylpyrrolidinone (NARP), N-acetylpiperidine, N-methylpiperidone-2 (NMPD), N,N'-dimethylethyleneurea, N,N'-dimethylpropyleneurea, N,N,N',N'-tetramethylmalonamide and N-acetylpyrrolidone, phenol-containing solvents such as p-chlorophenol, phenol, m-cresol, p-cresol and 2,4-dichlorophenol and mixtures of these. Of these, N,N-dimethylacetamide (DMAC) and N-methyl-2-pyrrolidinone (NMP) are preferred.

In this case, a proper amount of a known inorganic salt may be added before, during or at the time of completion of the polymerization for improving solubility. The above inorganic salt includes, for example, lithium chloride, calcium chloride and the like.

The polyamide is produced by polymerizing the above monomers (A), (B) and (C) in the above solvent dehydrated, in the same manner as in a general solution polymerization method for a polyamide. The reaction temperature in this case is adjusted to 80° C. or lower, preferably 60° C. or lower. The concentration as a monomer concentration in the above solution is preferably approximately 1 to 20% by weight.

In this invention, further, trialkylsilyl chloride can be used for attaining a higher polymerization degree of the polyamide.

In a generally used reaction of an acid chloride and a diamine, further, an aliphatic or aromatic amine or a quaternary ammonium salt can be used for capturing an acid generated, such as hydrogen chloride.

Having high concentration, the thus-obtained polyamide does not dissolve in the above polymerization solvent (generally, about several % by weight is the upper limit of the concentration), so that the polyamide is isolated after the polymerization and then dissolved in the basic solvent for obtaining the intended dope.

(Process for the Production of Fiber)

This invention includes a process for the production of a fiber formed of a polyoxazole, which comprises spinning a fiber out of the above dope, drawing the spun fiber, coagulating the fiber in a coagulating liquid and heat-treating the fiber at 200 to 900° C.

(Spinning)

In this invention, preferably, the dope is extruded through a spinneret to form a fiber. The spinneret is preferably formed of gold, platinum, palladium, rhodium or an anti-corrosive alloy of some or any ones of these.

(Drawing)

The spun fiber is drawn before it is coagulated in a coagulating liquid. The drawing is preferably carried out in an air-gap portion. The air gap refers to a space provided between the spinneret and the coagulating liquid.

When the dope is extruded through nozzles of the spinneret, a liquid crystal domain is oriented in the flow direction due to shearing in the nozzles, while the orientation of the liquid crystal domain becomes turbulent at outlets of the nozzles due to viscoelastic properties of the dope. The drawing in the air-gap portion hence makes a recovery from the above turbulence. Since the fiber is drawn and rendered thin due to a tension, a recover from the turbulence of the orientation can be easily accomplished.

The drawing ratio is preferably 1.5 to 300 times, more preferably 2 to 100 times, still more preferably 3 to 30 times. The drawn ratio is calculated on the basis of a ratio of an extrusion rate of the dope from the spinneret and a take-up rate of a coagulated fiber.

(Coagulation)

The fiber that has been rendered thin due to the drawing is coagulated in a coagulating liquid while it retains a highly-oriented molecular structure. As a result, a highly crystalline and highly oriented fiber can be obtained.

The coagulating liquid is preferably an aqueous solution of sulfuric acid or hydrochloric acid, an aqueous solution of ammonium chloride or acetone. The temperature of the coagulating liquid is preferably −30 to 150° C., more preferably 0 to 100° C., still more preferably 5 to 50° C.

Then, preferably, washing, neutralization, washing and drying are carried out.

(Heat Treatment)

In this invention, the thus-obtained fiber is further heat-treated at 200 to 900° C. The temperature for the heat treatment is preferably 250 to 700° C., more preferably 300 to 550° C. The heat treatment can be carried out in an inert atmosphere such as an atmosphere of air, nitrogen or argon.

In the heat treatment, OH groups substituted with $Ar^1$ in the formulae I and an amide bond undergo cyclization, whereby a polyoxazole having a recurring unit of the formula (I-a) or (I-b), or the recurring units of the formula (I-a) and (I-b) is obtained.

Further, it is preferred to carry out the heat treatment under tension. The tension that is applied during the heat treatment is preferably 0.1 to 80%, more preferably 1 to 30%, based on a breaking strength of the fiber before the heat treatment. The time period for the heat treatment is preferably 0.01 to 1,800 seconds, more preferably 0.1 to 600 seconds, still more preferably 1 to 300 seconds.

The fiber obtained by the process of this invention is formed of a polyoxazole containing at least one recurring unit selected from the group consisting of recurring units of the following formulae (I-a) and (I-b).

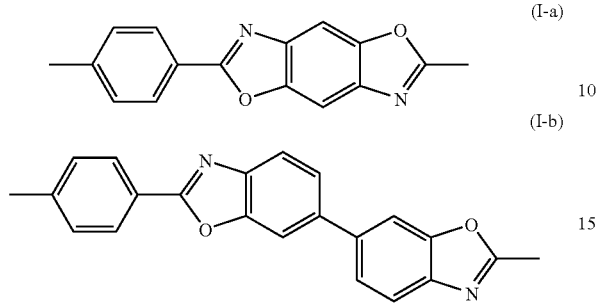

(I-a)

(I-b)

The polyoxazole preferably contains 50 to 100 mol % of at least one recurring unit selected from the group consisting of the recurring units of the following formulae (I-a) and (I-b) and 50 to 0 mol % of a recurring unit of the following formula (II).

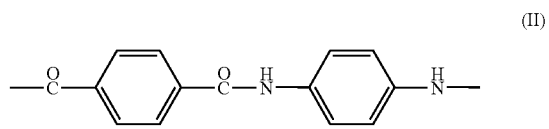

(II)

The polyoxazole further preferably contains 80 to 100 mol % of at least one recurring unit selected from the group consisting of the recurring units of the following formulae (I-a) and (I-b) and 20 to 0 mol % of a recurring unit of the formula (II). The polyoxazole further preferably contains 90 to 100 mol % of at least one recurring unit selected from the group consisting of the recurring units of the following formulae (I-a) and (I-b) and 10 to 0 mol % of a recurring unit of the formula (II). The polyoxazole further preferably contains 95 to 100 mol % of at least one recurring unit selected from the group consisting of the recurring units of the following formulae (I-a) and (I-b) and 5 to 0 mol % of a recurring unit of the formula (II).

(Properties of Fiber)

The inherent viscosity ($\eta_{inh}$) of a polyazole constituting the fiber obtained in this invention is preferably 1.5 to 100, more preferably 2.0 to 50, still more preferably 3.0 to 40. The above inherent viscosity ($\eta_{inh}$) refers to a value obtained by measurement of a polymer having a concentration of 0.03 g/100 ml in methanesulfonic acid at 30° C.

The content of a phosphorus atom in the fiber obtained in this invention is 30 ppm or less, more preferably 0 to 20 ppm, still more preferably 0 to 10 ppm.

The elastic modulus of the fiber obtained in this invention is 10 GPa or more, preferably 30 to 500 GPa, more preferably 70 to 350 GPa.

The fineness of the fiber obtained in this invention is preferably 0.01 to 100 dtex, more preferably 0.1 to 10 dtex, still more preferably 0.5 to 5 dtex.

The strength of the fiber obtained in this invention is preferably 100 to 10,000 mN/tex, more preferably 300 to 5,000 mN/tex, still more preferably 500 to 4,000 mN/tex.

The breaking strength of the fiber obtained in this invention is preferably 0.1 to 30%, more preferably 0.5 to 10%, still more preferably 1.0 to 8%.

The fiber formed of the polyoxazole, obtained in this invention, preferably has an orientation coefficient F, determined according to the following expressions (III), of 0.3 or more.

$$<\cos^2\phi> = \frac{\int_0^{\pi/2} I(\phi)\cos^2\phi \sin\phi d\phi}{\int_0^{\pi/2} I(\phi)\sin\phi d\phi} \quad \text{(III)}$$

$$F = \frac{3<\cos^2\phi> - 1}{2}$$

Wherein $\phi$ is an azimuth angle in X-ray diffraction measurement and I is a X-ray diffraction intensity.

The orientation coefficient F is more preferably 0.5 or more, still more preferably 0.8 or more. With an increase in the value of the orientation coefficient F, the elastic modulus of the fiber increases, which is preferred. The upper limit of the theoretical orientation coefficient F in the case of complete orientation is 1.0.

EXAMPLES

This invention will be further specifically explained with reference to Examples below, while this invention shall not be limited to descriptions of these Examples. Physical property values in Examples were measured by the following methods.

(1) Inherent Viscosity ($\eta_{inh}$)

The inherent viscosity of a polyamide was measured with regard to a polymer concentration of 0.5 g/dl in 95 wt % concentrated sulfuric acid at 30° C. The inherent viscosity of a polyazole was measured with regard to a polymer concentration of 0.03 g/100 mL in methanesulfonic acid at 30° C.

(2) Strength, Breaking Elongation, Elastic Modulus

A single fiber was measured with a TENSILON universal tester 1225A supplied by ORIENTEC Co., LTD., at a tensile rate of 10 mm/min.

(3) Content of Phosphorus Atom

A sample was placed in a wet decomposition vessel with a reflux condenser, concentrated sulfuric acid was added and then, with heating, nitric acid was dropwise added so gradually as not to dissipate any sample portion to completely decompose an organic material. After a decomposition product was cooled, pure water was added, and a constant volume of the decomposition product was placed in a white transparent glass vessel, followed by quantitative determination of phosphorus atoms by ICP emission spectrometry.

(4) X-Ray Diffraction Measurement

Measurement was made with an X-ray generator (RU-B type, supplied by Rigaku Corporation) using a target $CuK_\alpha$ ray under conditions of a voltage of 45 kV and a current of 70 mA. Incidence X-ray was focused and monochromatized with a multi-layer mirror supplied by Osmic, Inc, and the cross section of a sample was measured by a perpendicular transmission method. Diffraction X-ray was detected with an imaging plate having a size of 200 mm×250 mm (supplied by Fuji Photo Film Co., Ltd.) under a condition of a camera length of 250 mm.

Example 1

Preparation of Polyamide

Under nitrogen current, 30 parts by weight of calcium chloride was dried in a flask at 250° C. for 1 hour, and the temperature inside the flask was adjusted back to room temperature. Then, 562 parts by weight of N-methyl-2-pyrrolidinone (NMP) was added, and 18.75 parts by weight of 4,4'-diamino-3,3'-biphenyldiol was added and dissolved therein. The resultant solution was maintained at 0° C. by external cooling, 17.6037 parts by weight of terephthalic acid chloride was added, the mixture was allowed to react at 0° C. for 1 hour and at 50° C. for 2 hours and 12.84 parts by weight of calcium hydroxide was added to complete the reaction.

After completion of the reaction, the reaction mixture was poured into a large amount of ion-exchanged water to precipitate a polyamide. The thus-obtained polyamide was filtered, further washed with ethanol and acetone and vacuum-dried. The polyamide had an inherent viscosity ($\eta_{inh}$) of 5.73.

(Preparation of Dope)

6 Grams of the thus-obtained polyamide was charged into a dry round-bottom flask equipped with a mechanical stirrer made of stainless steel. The flask was heated up to 100° C. in vacuum for 30 minutes to remove residual water. The flask was cooled to room temperature (about 25° C.), then, an NaOH aqueous solution of 34 g of 1 N was added and the mixture was stirred. The resultant solution was maintained at this temperature for several hours and observed with an optical microscope at intervals of a constant time period to monitor the situation of dissolving. When 95% of polyamide particles were dissolved, the solution was heated up to 50° C. The solution was stirred for 40 minutes to give a uniform viscous dope. When the obtained dope was observed under crossed Nicols through a microscope, optical anisotropy was observed. The temperature Tni at which the dope became optically isotropic was not detectable since it was higher than the boiling point of the solvent.

Example 2

Spinning

The dope obtained in Example 1 was transferred to a cylinder and heated to 70° C. with degassing under reduced pressure. The dope was ejected through a thin metal spinneret having a hole diameter of 100 μm with a machine-operated syringe.

(Drawing)

It was ensured that the ejected fiber was drawn to be twice as long while it passed through a 1.0 cm air gap provided between the spinneret and a coagulating bath, and the drawn fiber was taken up with an electrically driven take-up machine through the coagulating bath.

(Coagulation)

A 1.5N hydrochloric acid solution was used as a coagulating liquid. The coagulating liquid was set at 25° C. After passed the coagulating liquid by 30 cm, the fiber was drawn up from the liquid at an angle of 45 degrees and taken up with the above electrically driven take-up machine. The fiber was taken up around a bobbin made of stainless steel at 20 m/minute, washed with water at room temperature on the bobbin for one hour and dried at 80° C. with a hot air dryer to give a fiber.

(Heat Treatment)

The thus-obtained poly-p-dihydroxy-biphenyleneterephthalamide yarn was wound around a rigid metal frame and heated at 450° C. for 10 minutes. It was identified by IR spectrum that the chemical structure of the dark red yarn was that of benzoxasole. In TGA analysis of a spun-fiber precursor fiber (measured at a temperature elevation rate of 10° C./minutes in a nitrogen atmosphere), a maximum weight loss rate was observed around 410° C. and a stable region was observed between 450° C. and 610° C. The measured weight loss by cyclization was 10.8%, which value is close to a theoretical value of 10.5%. This shows that conversion proceeds quantitatively. The decomposition start temperature was 630° C. (5% weight loss). The obtained fiber had an inherent viscosity ($\eta_{inh}$) of 7.6 and a phosphorus atom content of 12 ppm. Table 1 shows results of measurements of the fiber before the heat treatment and the fiber after the heat treatment.

TABLE 1

| | Elastic modulus (GPa) | Strength (mN/tex) | Elongation (%) | Orientation coefficient |
|---|---|---|---|---|
| Fiber before heat treatment | 12.8 | 193 | 7.4 | 0.55 |
| Fiber after heat treatment | 31.3 | 304 | 1.3 | 0.83 |

EFFECT OF THE INVENTION

The dope of this invention has excellent formability and can be formed into a fiber, a film, pulp-shaped particles and the like by a wet method. Further, the dope of this invention can give a molecule-oriented formed article excellent in elastic modulus and heat resistance by forming alone. Further, the dope of this invention uses a solvent having little corrosive action on a metal, so that the corrosion of an apparatus by the dope can be suppressed.

According to the process for the production of a fiber, provided by this invention, there can be produced a fiber excellent in heat resistance, strength and elastic modulus.

According to the production process of this invention, further, there can be produced an aromatic polyoxazole fiber having little content of a phosphorus compound such as polyphosphoric acid. Further, the production process of this invention has an advantage that a residual solvent can be removed by washing with water for a short period of time.

INDUSTRIAL APPLICABILITY

A fiber obtained by spinning the dope of this invention can be widely used in the fields of ropes, belts, insulating fabrics, reinforcement materials for thermosetting or thermoplastic resins, protective clothing and the like.

The invention claimed is:

1. A dope comprising a polyamide and a basic solvent, the polyamide containing a recurring unit of the following formula (I),

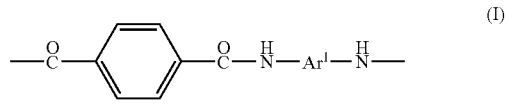

wherein Ar¹ represents at least one substituent selected from the group consisting of

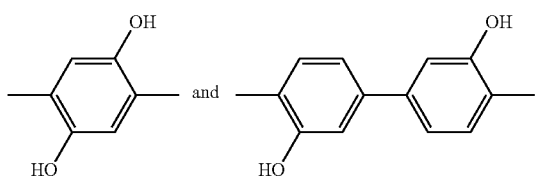

and having an inherent viscosity of 1 or more, the dope has a polyamide concentration of over 10% by weight but not more than 30% by weight and exhibits optical anisotropy at 50° C., and the basic solvent is an aqueous solution of alkali metal hydroxide, alkaline earth metal hydroxide or mixture thereof.

2. The dope of claim 1, wherein the basic solvent is an aqueous solution of sodium hydroxide or potassium hydroxide.

3. The dope of claim 1, wherein the polyamide contains 50 to 100 mol % of the recurring unit of the following formula (I),

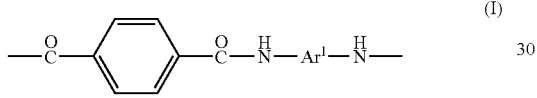

wherein Ar¹ represents at least one substituent selected from the group consisting of

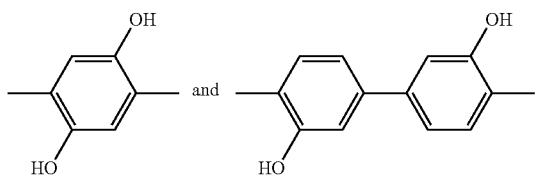

and 50 to 0 mol % of a recurring unit of the following formula (II),

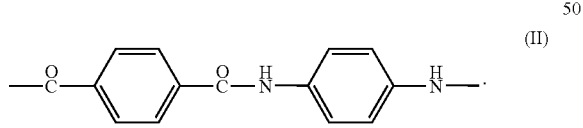

4. The dope of claim 3, wherein the polyamide contains 80 to 100 mol % of the recurring unit of the formula (I) and 20 to 0 mol % of the recurring unit of the formula (II).

5. The dope of claim 3, wherein the polyamide contains 90 to 100 mol % of the recurring unit of the formula (I) and 10 to 0 mol % of the recurring unit of the formula (II).

6. A process for the production of a fiber formed of a polyoxazole containing at least one recurring unit selected from the group consisting of the recurring units of the following formulae (I-a) and (I-b),

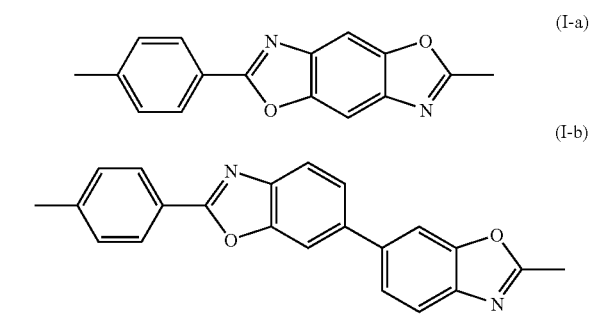

which comprises spinning a fiber out of a dope by extruding the dope through a spinneret, the dope comprising a polyamide of the following formula (I) and a basic solvent, the polyamide containing a recurring unit of the following formula (I), (I)

wherein Ar¹ represents at least one substituent selected from the group consisting of and having an inherent viscosity of 1 or more, the dope has a polyamide concentration of over 10% by weight but not more than 30% by weight and exhibits optical anisotropy at 50° C., and the basic solvent is an aqueous solution of alkali metal hydroxide, alkaline earth metal hydroxide or mixture thereof,
drawing a spun fiber at an air-gap portion with a drawing ratio of 1.5 to 300 times,
coagulating the fiber in a coagulating liquid having a temperature of −30 to 150° C., and
heat-treating the thus-obtained fiber at 200 to 900° C. for 0.01 to 1,800 seconds.

7. The process of claim 6, wherein the polyamide in the dope contains 50 to 100 mol % of the recurring unit of the formula (I) and 50 to 0 mol % of a recurring unit of the following formula (II),

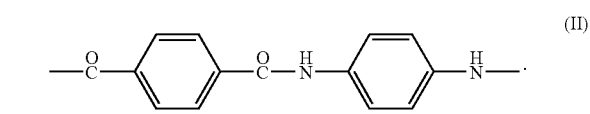

8. The process of claim 7, wherein the polyamide in the dope contains 80 to 100 mol % of the recurring unit of the formula (I) and 20 to 0 mol % of the recurring unit of the formula (II).

9. The process of claim 7, wherein the polyamide in the dope contains 90 to 100 mol % of the recurring unit of the formula (I) and 10 to 0 mol % of the recurring unit of the formula (II).

10. The process of claim 6, wherein the coagulating liquid is an aqueous solution of sulfuric acid or hydrochloric acid, an aqueous solution of ammonium chloride or acetone.

11. The process of claim 6, wherein the heat treatment is carried out under tension.

12. The process of claim 6, wherein the polyoxazole contains 50 to 100 mol % of at least one recurring unit selected from the group consisting of recurring units of the formulae (I-a) and (I-b) and 50 to 0 mol % of a recurring unit of the following formula (II),

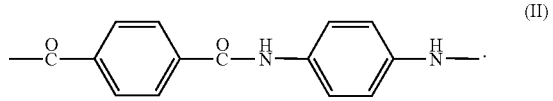

(II)

13. The process of claim 12, wherein the polyoxazole contains 80 to 100 mol % of at least one recurring unit selected from the group consisting of recurring units of the formulae (I-a) and (I-b) and 20 to 0 mol % of the recurring unit of the formula (II).

14. The process of claim 12, wherein the polyoxazole contains 90 to 100 mol % of at least one recurring unit selected from the group consisting of recurring units of the formulae (I-a) and (I-b) and 10 to 0 mol % of the recurring unit of the formula (II).

15. The process of claim 6, wherein the fiber obtained has a phosphorus atom content of 30 ppm or less.

16. The process of claim 6, wherein the fiber obtained has an elastic modulus of 10 GPa or more.

17. The process of claim 6, wherein the fiber obtained has an orientation coefficient F, determined according to the following expressions (III), of 0.3 or more, $$<\cos^2\phi> = \frac{\int_0^{\pi/2} I(\phi)\cos^2\phi\sin\phi d\phi}{\int_0^{\pi/2} I(\phi)\sin\phi d\phi}$$

$$F = \frac{3<\cos^2\phi>-1}{2}$$

(III)

wherein $\phi$ is an azimuth angle in X-ray diffraction measurement and I is a X-ray diffraction intensity.

* * * * *